(12) United States Patent
Asano

(10) Patent No.: US 9,167,149 B2
(45) Date of Patent: Oct. 20, 2015

(54) LENS APPARATUS AND IMAGING APPARATUS INCLUDING THE SAME

(71) Applicant: CANON KABUSHIKI KAISHA, Tokyo (JP)

(72) Inventor: Kota Asano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 13/870,824

(22) Filed: Apr. 25, 2013

(65) Prior Publication Data

US 2013/0286278 A1    Oct. 31, 2013

(30) Foreign Application Priority Data

Apr. 27, 2012  (JP) .................................. 2012-103230

(51) Int. Cl.
 *H04N 5/225*   (2006.01)
 *H04N 5/232*   (2006.01)

(52) U.S. Cl.
 CPC ......... *H04N 5/23212* (2013.01); *H04N 5/2254* (2013.01)

(58) Field of Classification Search
 CPC ... G03B 13/36; H04N 5/2254; H04N 5/23212
 USPC ................... 348/345, 357, 360–362
 See application file for complete search history.

(56) References Cited

U.S. PATENT DOCUMENTS

| 7,259,792 B2* | 8/2007 | Terada .......................... 348/368 |
| 7,884,877 B2* | 2/2011 | Toguchi ........................ 348/345 |
| 2009/0244325 A1* | 10/2009 | Honjo et al. ............. 348/231.99 |
| 2012/0262595 A1 | 10/2012 | Kishida et al. |

FOREIGN PATENT DOCUMENTS

| CN | 101191980 A | 6/2008 |
| CN | 101247477 A | 8/2008 |
| CN | 101344702 A | 1/2009 |
| JP | 2004004362 A | 1/2004 |
| JP | 2007006305 A | 1/2007 |
| JP | 201063162 A | 3/2010 |
| JP | 2011-024248 A | 2/2011 |
| JP | 2012063422 A | 3/2012 |
| WO | 2011048752 A1 | 4/2011 |

\* cited by examiner

*Primary Examiner* — Trung Diep
(74) *Attorney, Agent, or Firm* — Canon USA Inc. IP Division

(57) ABSTRACT

A lens apparatus includes an imaging optical system including a movable lens unit, a drive unit configured to drive the movable lens unit, and a control unit configured to cause the movable lens unit to perform a wobbling motion in an optical axis direction by alternatively outputting to the drive unit a first drive command for driving the movable lens unit at a first driving speed and a stop command for stopping driving of the movable lens unit, and to move the movable lens unit based on contrast information obtained from an image pickup unit during the wobbling motion of the movable lens unit, wherein, at least one of before and after outputting the first drive command to the drive unit, the control unit outputs to the drive unit a second drive command for driving the movable lens unit at a second driving speed lower than the first driving speed.

20 Claims, 7 Drawing Sheets

FIG. 3

| DRIVING FREQUENCY BASED ON DRIVE INSTRUCTION 2a | DRIVING FREQUENCY BASED ON DRIVE INSTRUCTION 1 | DRIVING FREQUENCY BASED ON DRIVE INSTRUCTION 2b | LENS NOISE |
|---|---|---|---|
| 120pps | 240pps | 120pps | 22dB |
| 120pps | 360pps | 120pps | 26dB |
| 120pps | 480pps | 120pps | 30dB |

FIG. 4

| DRIVING FREQUENCY BASED ON DRIVE INSTRUCTION 2a | DRIVING FREQUENCY BASED ON DRIVE INSTRUCTION 1 | DRIVING FREQUENCY BASED ON DRIVE INSTRUCTION 2b |
|---|---|---|
| 60pps | 240pps | 120pps |
| 60pps | 360pps | 120pps |
| 60pps | 480pps | 120pps |

FIG. 5

| DRIVING FREQUENCY BASED ON DRIVE INSTRUCTION 2c | DRIVING FREQUENCY BASED ON DRIVE INSTRUCTION 2a | DRIVING FREQUENCY BASED ON DRIVE INSTRUCTION 1 | DRIVING FREQUENCY BASED ON DRIVE INSTRUCTION 2b | DRIVING FREQUENCY BASED ON DRIVE INSTRUCTION 2d |
|---|---|---|---|---|
| 30pps | 60pps | 240pps | 120pps | 60pps |
| 30pps | 60pps | 360pps | 120pps | 60pps |
| 30pps | 60pps | 480pps | 120pps | 60pps |

FIG. 7
PRIOR ART

| DRIVING FREQUENCY BASED ON DRIVE INSTRUCTION | LENS NOISE |
|---|---|
| 240pps | 25dB |
| 360pps | 30dB |
| 480pps | 35dB |

LENS APPARATUS AND IMAGING APPARATUS INCLUDING THE SAME

BACKGROUND OF THE INVENTION

1. Field of the Invention

The present invention relates to a lens apparatus that performs a wobbling motion of a focus lens in order to determine a driving direction of the focus lens in which an object image comes closer to an in-focus state, and also relates to an imaging apparatus including the same.

2. Description of the Related Art

In a conventional still image capturing imaging apparatus or a conventional moving image capturing imaging apparatus, in order to determine a driving direction of a focus lens in which an object image formed by an imaging optical system comes to be in focus, the focus lens is minutely moved back and forth (i.e., a wobbling motion) in an optical axis direction of the imaging optical system.

For example, as discussed in Japanese Patent Application Laid-Open No. 2010-63162, the wobbling motion of a focus lens is performed in a plurality of follow-up modes independent from a frequency of an exposure synchronization while taking the exposure synchronization between a camera apparatus and a lens apparatus. Discussed therein is that the focus lens can be controlled at an appropriate frequency for the wobbling motion of the focus lens.

However, in the conventional art discussed in the above-described Japanese Patent Application Laid-Open No. 2010-63162, each follow-up mode has only one driving frequency (i.e., driving speed) during the wobbling motion. Further, as a mechanism design for causing the focus lens to operate in an optical axis direction, it is difficult to eliminate a back-lash of a connection unit in view of operation guarantee and part accuracy under various temperatures. As a result thereof, a mechanical collision noise cannot be prevented from being generated during the wobbling motion.

Therefore, in a case where the driving frequency is increased in order to improve controllability, the mechanical collision noise increases and thus such an inconvenience occurs that the noise tends to be recorded by a camera microphone as an operation noise of the focus lens. In the wobbling motion, an automatic focus operation is realized by causing the focus lens to move back and forth in an optical axis direction at a minute drive amplitude value to the extent that humans cannot visually confirm it in an captured moving image and a through-image.

The mechanical collision noise generated during the wobbling motion is a periodic sound generated in a short period such as an imaging period (i.e., a frame rate), so that the noise tends to be recognized as a grating sound in an audibility of human. Therefore, when capturing a moving image, recording of the mechanical collision noise generated during the wobbling motion is recognized as an unpleasant sound for a viewer of the moving image, resulting in inviting degradation of video quality (including sound).

A conventional camera has a through-image display function for causing a liquid crystal display provided on the rear surface of a camera body to display an image captured by an image sensor. The through-image is an image which is not to be recorded on a recording medium, such as a memory card, after the image capturing. An operator visually confirms the through-image, thereby being able to determine the composition of an object when capturing a still image thereof.

The mechanical collision noise generated during the wobbling motion does not involve a change of the captured moving image or through-image, so that the noise tends to be recognized as the grating sound in the audibility of human. Therefore, when capturing a moving image, recording of the mechanical collision noise during the wobbling motion and generation of the mechanical collision noise when capturing a still image or a moving mage are recognized as the unpleasant sound for the operator and a viewer of the moving image, resulting in inviting the degradation of the video quality (including sound).

SUMMARY OF THE INVENTION

The present invention is directed to an imaging apparatus capable of lowering a noise level during the wobbling motion.

According to an aspect of the present invention, a lens apparatus connectable to a camera apparatus including an image pickup unit includes an imaging optical system including a movable lens unit, a drive unit configured to drive the movable lens unit in an optical axis direction of the imaging optical system, and a control unit configured to cause the movable lens unit to perform a wobbling motion in the optical axis direction by alternatively outputting to the drive unit a first drive command for driving the movable lens unit at a first driving speed and a stop command for stopping driving of the movable lens unit, and to move the movable lens unit based on contrast information obtained from the image pickup unit during the wobbling motion of the movable lens unit in the optical axis direction, wherein, at least one of before outputting the first drive command to the drive unit and after outputting the first drive command to the drive unit, the control unit outputs to the drive unit a second drive command for driving the movable lens unit at a second driving speed lower than the first driving speed.

According to exemplary embodiments of the present invention, an imaging apparatus capable of lowering the noise level during the wobbling motion can be provided.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates drive commands and a lens noise in the example of the driving operation according to the exemplary embodiment of the present invention.

FIG. 4 illustrates drive commands in another example of the driving operation according to the exemplary embodiment of the present invention.

FIG. 5 illustrates drive commands in another example of the driving operation according to the exemplary embodiment of the present invention.

FIG. 7 illustrates a drive command and a lens noise in the example of the driving operation of conventional art.

DESCRIPTION OF THE EMBODIMENTS

Various exemplary embodiments, features, and aspects of the invention will be described in detail below with reference to the drawings.

Figure 1:
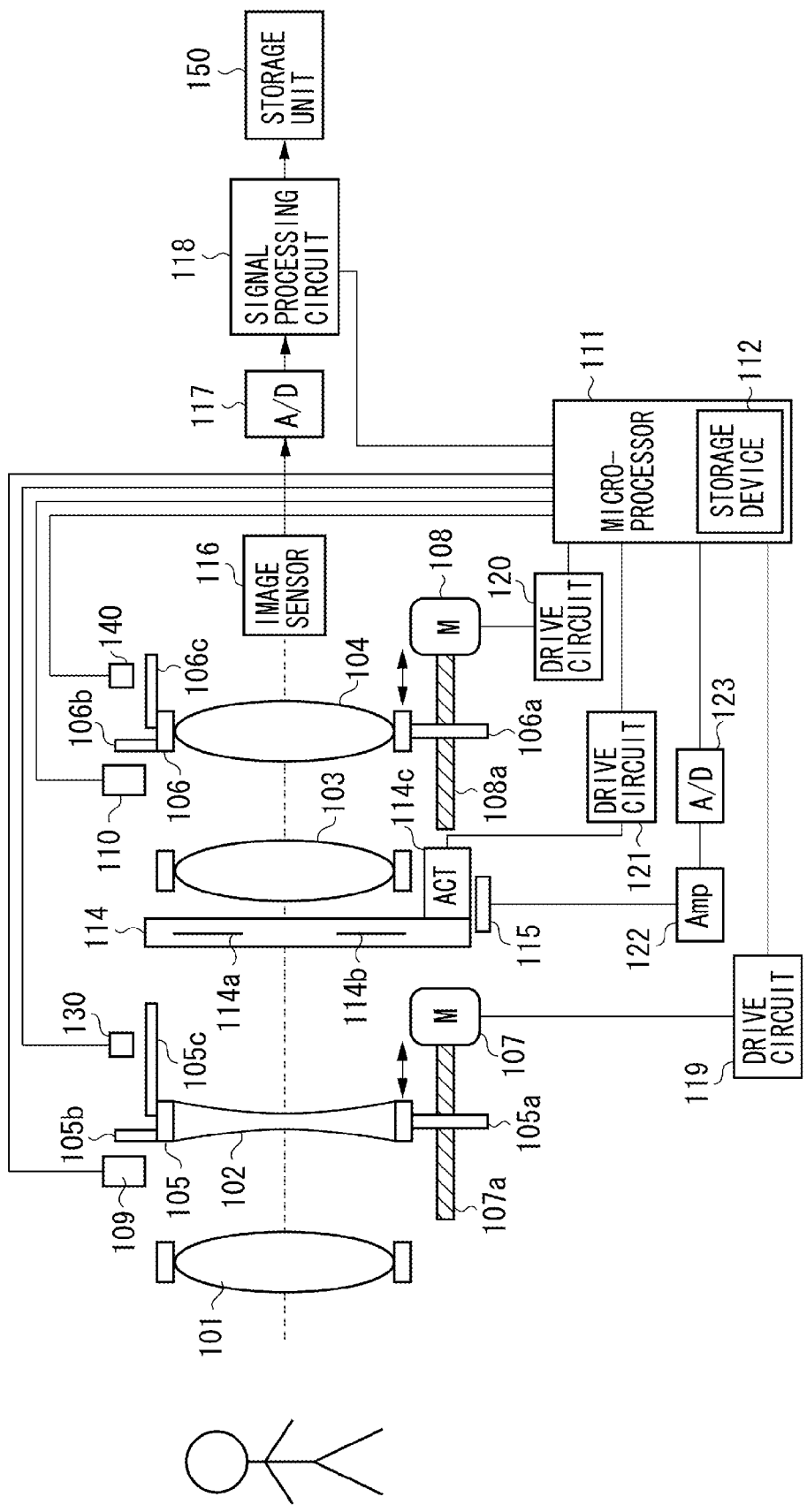
FIG. 1 is a block diagram illustrating an imaging apparatus according to an exemplary embodiment of the present invention.

FIG. 1 is a block diagram illustrating an imaging apparatus (i.e., a lens apparatus and a camera apparatus) according to an exemplary embodiment of the present invention.

An imaging optical system of the lens apparatus includes, in an order from the object side, a field lens 101, a zoom lens group 102 as a variable power lens, a diaphragm (i.e., an aperture stop) 114 for adjusting the amount of light, an afocal lens 103, and a focus lens group 104 as a focusing lens.

An image sensor 116 as an image pickup unit includes a charge-coupled device (CCD) sensor or a complementary metal-oxide semiconductor (CMOS) sensor for photoelectrically converting an object image formed by the imaging optical system. The image sensor 116 is included in the camera apparatus. The lens apparatus can be connected to the camera apparatus including the image sensor 116. A lens drive unit includes a lens holding frame, a guide shaft (not illustrated), a rack, a stepping motor, a screw shaft, and a drive circuit in a manner as described below. The zoom lens group 102 and the focus lens group 104 are held, respectively, by a zoom lens holding frame 105 and a focus lens holding frame 106. The lens holding frames 105 and 106 are configured to be movable in the optical axis direction by using a guide shaft (not illustrated).

The lens holding frames 105 and 106 are provided with, respectively, racks 105a and 106a. The racks 105a and 106a mate with screw units of screw shafts 107a and 108a as output shafts of the stepping motors 107 and 108 in a corresponding manner.

Each of the stepping motors 107 and 108 is driven to rotate the corresponding one of the screw shafts 107a and 108a. By mating effect between the screw shafts 107a and 108a and the corresponding racks 105a and 106a, the lens holding frames 105 and 106 are caused to move in an optical axis direction (i.e., in an arrow direction in FIG. 1) of the imaging optical system. The stepping motors 107 and 108 are driven to move, respectively, the zoom lens group (i.e., the zoom lens) 102 and the focus lens group (i.e., the focus lens) 104 in the optical axis direction of the imaging optical system.

In such a configuration, in order for the focus lens group 104 to be driven in the optical axis direction of the imaging optical system, each connection unit between drive units are given a mechanical back-lash. More specifically, the back-lash is given, respectively, between the focus lens holding frame 106 and a guide shaft (not illustrated), between the focus lens holding frame 106 and the rack 106a, between the rack 106a and a screw shaft 108a, and within the stepping motor 108. A drive unit of the zoom lens group 102 is also given a mechanical back-lash in a similar manner as the drive unit of the focus lens group 104. The purpose for giving the mechanical back-lash is to satisfy a mechanism design in view of operation guarantee and part accuracy under various temperatures.

In a case where the zoom lens group 102 and the focus lens group 104 are driven to each respective target position by means of the stepping motors 107 and 108, each lens is set at a position (i.e., a reset position) as a reference position for positional control when activating the imaging apparatus. The imaging apparatus is provided with a reset position sensor for detecting whether each of the zoom lens group 102 and the focus lens group 104 is positioned at each respective reset position.

The reset position sensor includes a photo-interrupters 109 and 110, each including a light emitting element and a light-sensitive element being formed into one piece. Light shielding members 105b and 106b provided on the corresponding lens holding frames 105 and 106 enter into a light path between the light emitting element and the light-sensitive element of the photo-interrupters 109 and 110. Accordingly, light advancing from the light emitting element to the light-sensitive element is shielded to detect whether the zoom lens group 102 and the focus lens group 104 are positioned at the respective reset positions thereof.

The light shielding member 105b is configured to be a shape capable of detecting whether a zone is a telephoto side or a wide-angle side of the zoom lens group 102. The light shielding member 106b is configured to be a shape capable of detecting whether a zone is a position for focusing on a distant object or a position for focusing on a close object of the focus lens group 104. A drive waveform having a necessary number of drive pulses is input into each of the stepping motors 107 and 108 from the corresponding stepping motor drive circuits 119 and 120 in order to move each of the zoom lens group 102 and the focus lens group 104 to each respective target position from each respective reset position. In the present exemplary embodiment, micro-step drive for forming a substantial sine (cosine) waveform is employed.

The zoom lens holding frame 105 is provided with a zoom position scale 105c secured thereon for detecting a position of the zoom lens group 102. Further, a zoom position sensor 130 is provided to be secured on a portion opposite to the zoom position scale 105c of the lens barrel unit (not illustrated). A scale pattern such as a magnetic pattern or a light reflection pattern is generated on the zoom position scale 105c in the optical axis direction to thereby cause the zoom position sensor 130 to read out a magnetic signal or a light reflection signal corresponding to the position of the scale. As a result thereof, a feed rate of the zoom lens group 102 in the optical axis direction can be detected. The detection signal of the zoom position sensor 130 is input into the microprocessor 111 to be used for controlling the position of the zoom lens group 102.

The focus lens holding frame 106 is provided with a focus position scale 106c secured thereon for detecting the position of the focus lens group 104. A focus position sensor 140 is secured on a portion opposed to the focus position scale 106c of the lens barrel unit (not illustrated). A scale pattern such as a magnetic pattern or a light reflection pattern is generated on the focus position scale 106c in the optical axis direction, and the focus position sensor 140 reads out a magnetic signal or a light reflection signal according to the position of the scale.

Accordingly, a feed rate of the focus lens group 104 in the optical axis direction can be detected. The detection signal of the focus position sensor 140 is input into the microprocessor 111, as a control unit, to be used for controlling the position of the focus lens group 104. The microprocessor 111 may be provided to either one of the lens apparatus or the camera apparatus or may be provided to both of the lens apparatus and the camera apparatus.

Each of the output waveforms of the above described position sensors 130 and 140 has a shape of a trigonometric function with respect to a time axis, and the position of the lens can be calculated as a value corresponding to an angle of a sine function or a cosine function. Each of the stepping motors 107 and 108 is driven according to information as to a drive value (i.e., drive amount) input into each of stepping motor drive circuits 119 and 120 from the microprocessor 111. A variable magnification operation and an in-focus operation involved therein of the imaging optical system are performed by controlling the stepping motors 107 and 108 according to an electronic cam method using cam locus data generally used in a digital video camera.

The microprocessor 111 controls a whole operation of the imaging apparatus according to an input signal from a switch, such as a power switch, a recording switch, and a zoom switch as the operation unit (not illustrated).

A storage device (i.e., a storage unit) 112 provided in the microprocessor 111 stores positions of the telephoto side and the wide-angle side (i.e., the telephoto end and the wide-angle end) with respect to the reset position of the zoom lens group 102. More specifically, the data is stored as position data of the zoom lens group 102 sensed by the zoom position sensor 130. With respect to the reset position of the focus lens group 104, position data determined by an object distance sensed by the focus position sensor 140 and a position of the zoom lens group 102 is also stored.

The diaphragm (i.e., an aperture stop) 114 includes a galvano type actuator 114c and diaphragm blades 114a and 114b, which is driven for opening and closing by the actuator 114c, and a position detection device (i.e., a Hall element) 115 for detecting an open/closed state of the diaphragm 114.

In a flow of capturing an image, the captured image is converted into an electrical signal from an optical image by an image sensor 116, and then the electrical signal is converted from an analog signal to a digital signal by an analog-to-digital (A/D) conversion circuit 117 to be input into a signal processing circuit 118.

A signal processing circuit 118 provides various image processing to the input electrical signal to generate luminance signal information indicating the exposure state of an image. The signal processing circuit 118 further converts the luminance signal information into a recordable data formant to transmit a video signal to a storage unit (recording unit) 150. The microprocessor 111 performs feedback control with respect to the actuator 114c such that the luminance signal information obtained from the signal processing circuit 118 always keeps an appropriate value.

At that time, an output from the position detection device 115 is amplified by an amplifier (Amp) 122 and further converted from an analogue signal to a digital signal by an analogue-to-digital (A/D) conversion circuit 123 to be input into the microprocessor 111 as information indicating an open/closed position of the diaphragm. The microprocessor 111 transmits an open/close signal to a drive circuit 121 such that the luminance signal information always keeps an appropriate value based on the diaphragm position information, thereby controlling the actuator 114c. Further, the microprocessor 111 can transmit the open/close signal for positioning the diaphragm position at an arbitral predetermined open/close position to the drive circuit 121. The series of operation is performed at a predetermined imaging period, i.e., at 60 Hz in the present exemplary embodiment.

The focus lens group 104 is a lens group for changing a focus state of an object image formed on the image sensor 116 by the imaging optical system. The microprocessor 111 controls the wobbling motion of the focus lens group 104 in synchronization with the imaging period based on contrast information obtained by the image sensor 116 in order to determine a driving direction of the focus lens group 104 in which the object image comes close to an in-focus state. In other words, in order to detect a direction of change of a contrast value in the object image, the wobbling motion of the focus lens group 104 is performed. The wobbling motion of the focus lens group 104 (i.e., a minute back-and-forth movement of the focus lens group 104 in the optical axis direction) enables continuous focusing with respect to a moving object. The wobbling motion is performed during the automatic focus operation.

With reference to FIGS. 2 through 7, a driving method for causing the focus lens group 104 to perform the wobbling motion in the imaging apparatus illustrated in FIG. 1 is described below.

Figure 6:
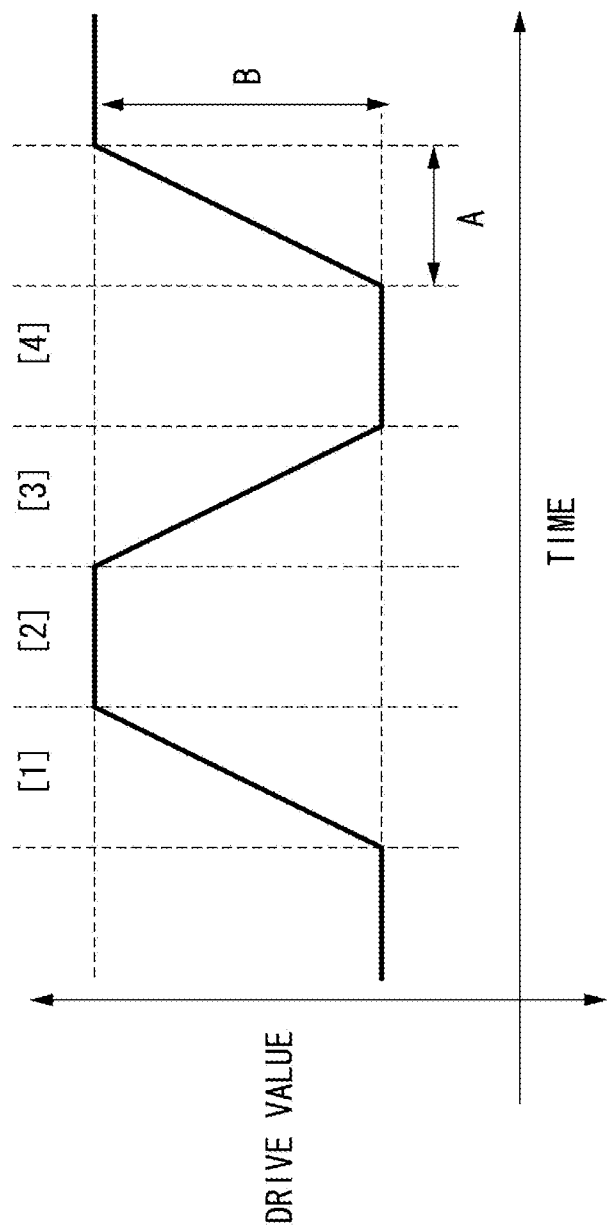
FIG. 6 illustrates an example of a driving operation of conventional art.

FIG. 6 illustrates an example of a driving operation of conventional art. In FIG. 6, the vertical axis represents a drive value (i.e., a drive amount) for the focus lens group 104 to be transmitted to the stepping motor drive circuit 120 from the microprocessor 111 and the horizontal axis represents time. FIG. 6 illustrates that a time A of an imaging period is set to about 16.7 ms (i.e., 60 Hz) in the present exemplary embodiment. FIG. 6 illustrates a drive value (i.e., a drive amount) B during the wobbling motion. FIG. 6 illustrates an example in which commands are output alternately from the microprocessor 111 to the stepping motor drive circuit 120 per imaging period, e.g., [1] drive command→[2] stop command→[3] drive command→[4] stop command→ . . . for the focus lens group 104.

In an inclined section in a graph (e.g., [1] and [3]), the focus lens group 104 is driven in response to a drive command, whereas, in a horizontal section, i.e., a section without inclination, of the graph (i.e., [2] and [4]), the focus lens group 104 is stopped in response to a stop command. A driving speed of the focus lens group 104 (i.e., a driving frequency of the stepping motor 108) is determined by a time of the imaging period and a drive value (i.e., a drive amount) for the focus lens group 104. The conventional example of a driving operation as illustrated in FIG. 6 has only one drive command. Further, because of the mechanical back-lash of the above-described each connection unit, when the driving speed of the focus lens group 104 (i.e., the driving frequency of the stepping motor 108) is increased, the lens noise (i.e., the noise generated according to driving of the lens) increases.

FIG. 7 illustrates a drive command and a lens noise in the conventional art. As seen from FIG. 7, the lens noise when the focus lens group 104 is caused to perform the wobbling motion at the driving frequency of 240 pps is 25 dB, whereas if the driving frequency is increased to 360 pps and 480 pps in this order, the lens noise is increased to 30 dB and 35 dB. This is because the increase of the driving frequency during the wobbling motion increases a kinetic energy of the focus lens group 104 and thus the mechanical collision noise in the above-described each connection unit increases.

Figure 2:
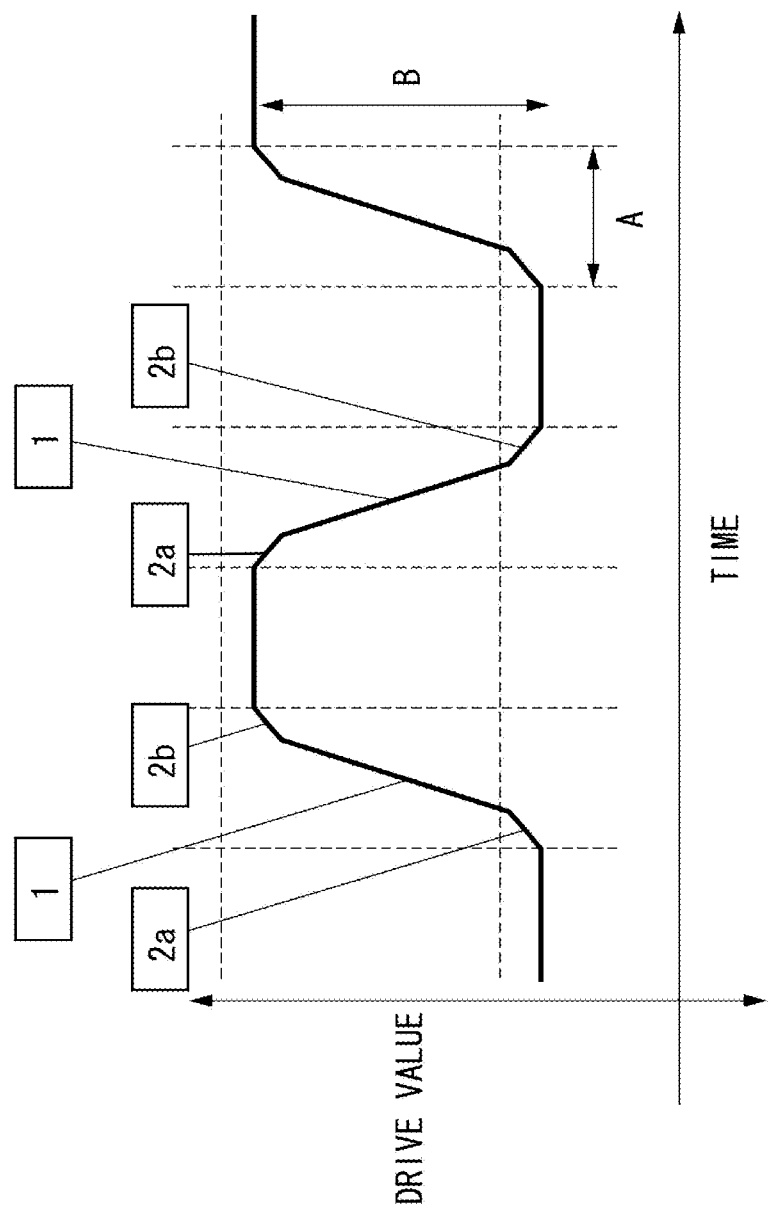
FIG. 2 illustrates an example of a driving operation according to the exemplary embodiment of the present invention.

The drive command according to the present exemplary embodiment is described below with reference to FIG. 2. FIG. 2 illustrates a drive command according to the present exemplary embodiment. The vertical axis and the horizontal axis and contents of A and B are the same as those in FIG. 6, so that the descriptions thereof are omitted here.

In the example of the driving operation of the conventional art as illustrated in FIG. 6, the driving operation has only one drive command; however, the example of a driving operation according to the present exemplary embodiment as illustrated in FIG. 2 has three drive commands (e.g., a drive command 1, a drive command 2a, and a drive command 2b). In other words, as the drive command during the wobbling motion of the focus lens group 104, a drive command 2a and a drive command 2b are output to the stepping motor drive circuit 120 before the drive command 1 is output to the drive unit and after the drive command 1 is output to the drive unit, respectively. The driving frequency of the stepping motor 108 based on the drive command 2a and the drive command 2b is at a speed lower than the driving frequency based on the drive command 1 of the stepping motor 108. The drive command 1 is a drive command as a first drive command and the drive command 2a and the drive command 2b are drive commands as second drive commands.

The driving frequency of the stepping motor 108 (i.e., the driving speed of the focus lens 104) according to the drive commands 1, 2a, and 2b is reversed at a stop state of the stepping motor 108 (i.e., the focus lens group 104); however, in FIG. 3, it is illustrated without distinction.

The driving speed of the focus lens group 104 (i.e., the driving frequency of the stepping motor 108) driven by the drive commands 1, 2a, and 2b are set based on the imaging period. In other words, the driving speed of the focus lens group 104 (i.e., the driving frequency of the stepping motor 108) is set within a time of the imaging period. Accordingly, the wobbling motion of the focus lens group 104 in synchronization with the imaging period can be controlled. As far as the condition that a predetermined drive value (i.e., a drive amount) is driven within the imaging period is satisfied, the driving speed (specifically, the driving speed according to the drive commands 2a and 2b) may be set to a value as low as possible. This is because, as the driving speed is set to the lower speed, the mechanical collision noise generated during the wobbling motion can be minimized. In a case where an upper value of a level of the lens noise is preliminary determined, as far as a condition that the level of the lens noise is set to a value equal to or less than the upper limit and a condition that a predetermined drive value (i.e., a drive amount) is driven within the imaging period are satisfied, the driving speed (i.e., the driving speed according to the drive commands 1, 2a, and 2b) can be set as required.

Each of the drive commands 1, 2a, and 2b (i.e., the drive value driven by the drive commands 1, 2a, and 2b) is set based on an F-number of the imaging optical system included in the lens apparatus. In other words, the drive value (i.e., the drive amount) of the focus lens group 104 is set so as to be increased/decreased according to large or small of the F-number. This is because, according to the large or small of the F-number, a depth of focus and a depth of field change and, according to the depth of focus and the depth of field, the drive value (i.e., the drive amount) of the focus lens group 104 required during the wobbling motion also changes. The driving speed of the focus lens group 104 (i.e., the driving frequency of the stepping motor 108) is set within a time of the imaging period, so that the driving speed of the focus lens group 104 is set according to the thus set drive value (i.e., the drive amount) and the time of the imaging period. The drive commands 1, 2a, and 2b are set in order to drive the focus lens group 104 at the set driving speed. Accordingly, while the drive value (i.e., the drive amount) of the focus lens group 104 is increased/decreased according to the large or small of the F-number, the wobbling motion of the focus lens group 104 in synchronization with the imaging period can be controlled.

FIG. 3 illustrates a drive command and the lens noise according to the present exemplary embodiment. As an example illustrated in FIG. 3, in a case where 240 pps, 360 pps, and 480 pps are set as the driving frequency (i.e., the first driving speed) based on the drive command 1 and in a case where 120 pps is set as the driving frequency (i.e., the second driving speed) based on the drive commands 2a and 2b, the following effects can be confirmed.

Initially, the above-described setting of the present exemplary embodiment is made with respect to the lens noise of 35 dB (FIG. 7) in a case where 480 pps is used as the driving frequency in the example of the conventional driving operation, so that the lens noise in a case where the 480 pps is used as the driving frequency is 30 dB (FIG. 3). In other words, the lens noise is decreased by 5 dB. Secondary, in a case where the lens noise of 30 dB is set to the upper limit of use, the driving frequency can be increased from 360 pps (FIG. 7) to 380 pps (FIG. 3) in the conventional comparison example of a driving operation. In other words, without inviting degradation of the video quality (including sound), the drive value (i.e., the drive amount) of the focus lens group 104 can be set larger and thus a controllability during the wobbling motion can be improved.

FIGS. 4 and 5 illustrate other drive commands according to the present exemplary embodiment. In FIG. 4, the driving frequency of the stepping motor 108 based on the drive command 2a as a second drive command is smaller than the driving frequency based on the drive command 2b as, similarly, a second drive command. As described above, the driving frequency may be differently set between the drive commands as the second drive commands.

In FIG. 5, the drive command as the second drive command includes a plurality of drive commands (e.g., the drive commands 2a and 2c) which gradually accelerate the focus lens group 104 before the first drive command is output to the drive unit. Further, after the first drive command is output to the drive unit, the drive command includes a plurality of drive commands (e.g., the drive commands 2b and 2d) for gradually decelerating the focus lens group 104. As described above, the frequent output of the drive command can decrease the lens noise before and after the first drive command is output.

In the present exemplary embodiment, each of the drive commands 1, 2a, and 2b is set based on the F-number of the imaging optical system included in the lens apparatus; however, the present invention is not limited thereto. For example, instead of the F-number, the drive commands 1, 2a, and 2b may be set based on a state of the zoom lens, a state of the aperture stop (a position in the case of the zoom lens and an aperture value in the case of the aperture stop), or the depth of focus and the depth of field of the imaging optical system held by the lens apparatus.

In the present exemplary embodiment, the focus lens group 104 is caused to perform the wobbling motion; however, the present invention is not limited thereto but a movable lens unit other than the focus lens may be caused to perform the wobbling motion.

The driving method of the stepping motor to be used in the present exemplary embodiment is not limited to any method and thus not only the micro-step drive method but also a 1-2 phase driving method or a 2-2 phase driving method may be used.

In the present exemplary embodiment, in both of before the drive command (i.e., the drive command 1) corresponding to the first drive command is output and after the drive command (i.e., the drive command 1) corresponding to the first drive command is output, the drive commands (i.e., the drive commands 2a and 2b) corresponding to the second drive command are output. However, the drive commands maybe output in either one of before the output or after the output.

The stepping motor is used as, but not limited to, the lens drive unit of the present exemplary embodiment. For example, a direct current (DC) motor, a linear motor, or an ultra sonic motor may also be used.

The galvano type actuator, but not limited to, is used as the diaphragm of the present exemplary embodiment. For example, a stepping motor, a DC motor, a linear motor, or an ultra sonic motor may be used.

Further, in the diaphragm control of the present exemplary embodiment, the actuator is provided with the feedback control such that the luminance signal information obtained from the signal processing circuit always becomes an appropriate value. Open loop control may also be employed by using the other motor.

The imaging period of the present exemplary embodiment is set to 60 Hz but the imaging period is not limited to any value, so that not only 30 Hz but also 120 Hz or 240 Hz may also be used.

In the driving frequency of the focus lens group 104 of the present exemplary embodiment, the same driving frequency is set in the wobbling motion in the optical axis direction; however, the drive commands and the kind of the driving frequency based on the drive commands is not limited to anything but may be freely set.

In the present exemplary embodiment, the drive command and the stop command are alternately output per imaging period. However, an output method of the drive command and the stop command in the present invention is not limited thereto. For example, the drive command or the stop command may be continuously output in the continuous imaging period. In this case, the driving speed and the drive command to be driven at the driving speed is set within the sum of time of the continuing imaging period.

In the present exemplary embodiment, the position scale and the position sensor are mounted as a position sensor for sensing the position of each lens group. However, an effect of the present invention can be produced without these position detectors.

In the present exemplary embodiment, the stepping motor is used in order for the zoom lens group and the focus lens group to be electrically operated in the optical axis direction. However, for example, the zoom lens group may be manually operated in the optical axis direction. In other words, in a case where a lens group belonging to the imaging optical system is caused to move minutely in the optical axis direction, the present invention is applicable without being affected by the other configuration.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-103230 filed Apr. 27, 2012, which is hereby incorporated by reference herein in its entirety.

What is claimed is:

1. A lens apparatus connectable to a camera apparatus including an image pickup unit, the lens apparatus comprising:
    an imaging optical system including a movable lens unit;
    a drive unit configured to drive the movable lens unit in an optical axis direction of the imaging optical system; and
    a control unit configured to cause the movable lens unit to perform a wobbling motion in the optical axis direction by alternatively outputting to the drive unit a first drive command for driving the movable lens unit at a first driving speed and a stop command for stopping driving of the movable lens unit, and to move the movable lens unit based on contrast information obtained from the image pickup unit during the wobbling motion of the movable lens unit in the optical axis direction,
    wherein, in the wobbling motion, before outputting the first drive command to the drive unit and after outputting the stop command to the drive unit, and before outputting the stop command to the drive unit and after outputting the first drive command to the drive unit, the control unit outputs to the drive unit a second drive command for driving the movable lens unit at a second driving speed lower than the first driving speed.

2. The lens apparatus according to claim 1, wherein the second drive command includes a plurality of drive commands for gradually accelerating the movable lens unit before the first drive command is output to the drive unit, and the second drive command includes a plurality of drive commands for gradually decelerating the movable lens unit after the first drive command is output to the drive unit.

3. The lens apparatus according to claim 1, wherein the control unit sets at least one of the first drive command and the second drive command based on an imaging period of the image pickup unit.

4. The lens apparatus according to claim 1, wherein the imaging optical system includes a zoom lens and an aperture stop, and
    wherein the control unit sets at least one of the first drive command and the second drive command based on an imaging period of the image pickup unit and states of the zoom lens and the aperture stop.

5. The lens apparatus according to claim 1, wherein the control unit sets at least one of the first drive command and the second drive command based on an imaging period of the image pickup unit and an F-number of the imaging optical system.

6. The lens apparatus according to claim 1, wherein the control unit sets at least one of the first drive command and the second drive command based on an imaging period of the image pickup unit and a depth of focus of the imaging optical system.

7. The lens apparatus according to claim 1, wherein the control unit sets at least one of the first drive command and the second drive command based on an imaging period of the image pickup unit and a depth of field of the imaging optical system.

8. The lens apparatus according to claim 1, wherein the drive unit drives the movable lens unit by micro-step drive.

9. The lens apparatus according to claim 1, wherein the lens apparatus is detachable from the camera apparatus.

10. An imaging apparatus comprising:
    a lens apparatus including:
    an imaging optical system including a movable lens unit;
    a drive unit configured to drive the movable lens unit in an optical axis direction of the imaging optical system; and
    a control unit configured to cause the movable lens unit to perform a wobbling motion in the optical axis direction by alternatively outputting to the drive unit a first drive command for driving the movable lens unit at a first driving speed and a stop command for stopping driving of the movable lens unit, and to move the movable lens unit based on contrast information obtained from the image pickup unit during the wobbling motion of the movable lens unit in the optical axis direction,
    wherein, in the wobbling motion, before outputting the first drive command to the drive unit and after outputting the stop command to the drive unit, and before outputting the stop command to the drive unit and after outputting the first drive command to the drive unit, the control unit outputs to the drive unit a second drive command for driving the movable lens unit at a second driving speed lower than the first driving speed; and
    a camera apparatus including an image pickup unit configured to photoelectrically convert an object image formed by the imaging optical system of the lens apparatus.

11. The imaging apparatus according to claim 10, wherein the second drive command includes a plurality of drive commands for gradually accelerating the movable lens unit before the first drive command is output to the drive unit, and the second drive command includes a plurality of drive commands for gradually decelerating the movable lens unit after the first drive command is output to the drive unit.

12. The imaging apparatus according to claim 10, wherein the control unit sets at least one of the first drive command and the second drive command based on an imaging period of the image pickup unit.

13. The imaging apparatus according to claim 10, wherein the imaging optical system includes a zoom lens and an aperture stop, and
   wherein the control unit sets at least one of the first drive command and the second drive command based on an imaging period of the image pickup unit and states of the zoom lens and the aperture stop.

14. The imaging apparatus according to claim 10, wherein the control unit sets at least one of the first drive command and the second drive command based on an imaging period of the image pickup unit and an F-number of the imaging optical system.

15. The imaging apparatus according to claim 10, wherein the control unit sets at least one of the first drive command and the second drive command based on an imaging period of the image pickup unit and a depth of focus of the imaging optical system.

16. The imaging apparatus according to claim 10, wherein the control unit sets at least one of the first drive command and the second drive command based on an imaging period of the image pickup unit and a depth of field of the imaging optical system.

17. The imaging apparatus according to claim 10, wherein the drive unit drives the movable lens unit by micro-step drive.

18. The imaging apparatus according to claim 10, wherein the lens apparatus is attachable to and detachable from the camera apparatus.

19. A lens apparatus connectable to a camera apparatus including an image pickup unit, the lens apparatus comprising:
   an imaging optical system including a movable lens unit;
   a drive unit configured to drive the movable lens unit in an optical axis direction of the imaging optical system; and
   a control unit configured to cause the movable lens unit to perform a wobbling motion in the optical axis direction by alternatively controlling the drive unit to drive the movable lens unit at a first driving speed and to stop the movable lens unit,
   wherein, in the wobbling motion, before controlling the drive unit to drive the movable lens unit at the first driving speed and after controlling the drive unit to stop the movable lens unit, and before controlling the drive unit to stop the movable lens unit and after controlling the drive unit to drive the movable lens unit at the first driving speed, the control unit controls the driving unit to drive the movable lens unit at a second driving speed lower than the first driving speed.

20. An imaging apparatus comprising:
   a lens apparatus including:
   an imaging optical system including a movable lens unit;
   a drive unit configured to drive the movable lens unit in an optical axis direction of the imaging optical system; and
   a control unit configured to cause the movable lens unit to perform a wobbling motion in the optical axis direction by alternatively controlling the drive unit to drive the movable lens unit at a first driving speed and to stop the movable lens unit,
   wherein, in the wobbling motion, before controlling the drive unit to drive the movable lens unit at the first driving speed and after controlling the drive unit to stop the movable lens unit, and before controlling the drive unit to stop the movable lens unit and after controlling the drive unit to drive the movable lens unit at the first driving speed, the control unit controls the driving unit to drive the movable lens unit at a second driving speed lower than the first driving speed; and
   a camera apparatus including an image pickup unit configured to photoelectrically convert an object image formed by the imaging optical system of the lens apparatus.

\* \* \* \* \*